Figure 1:
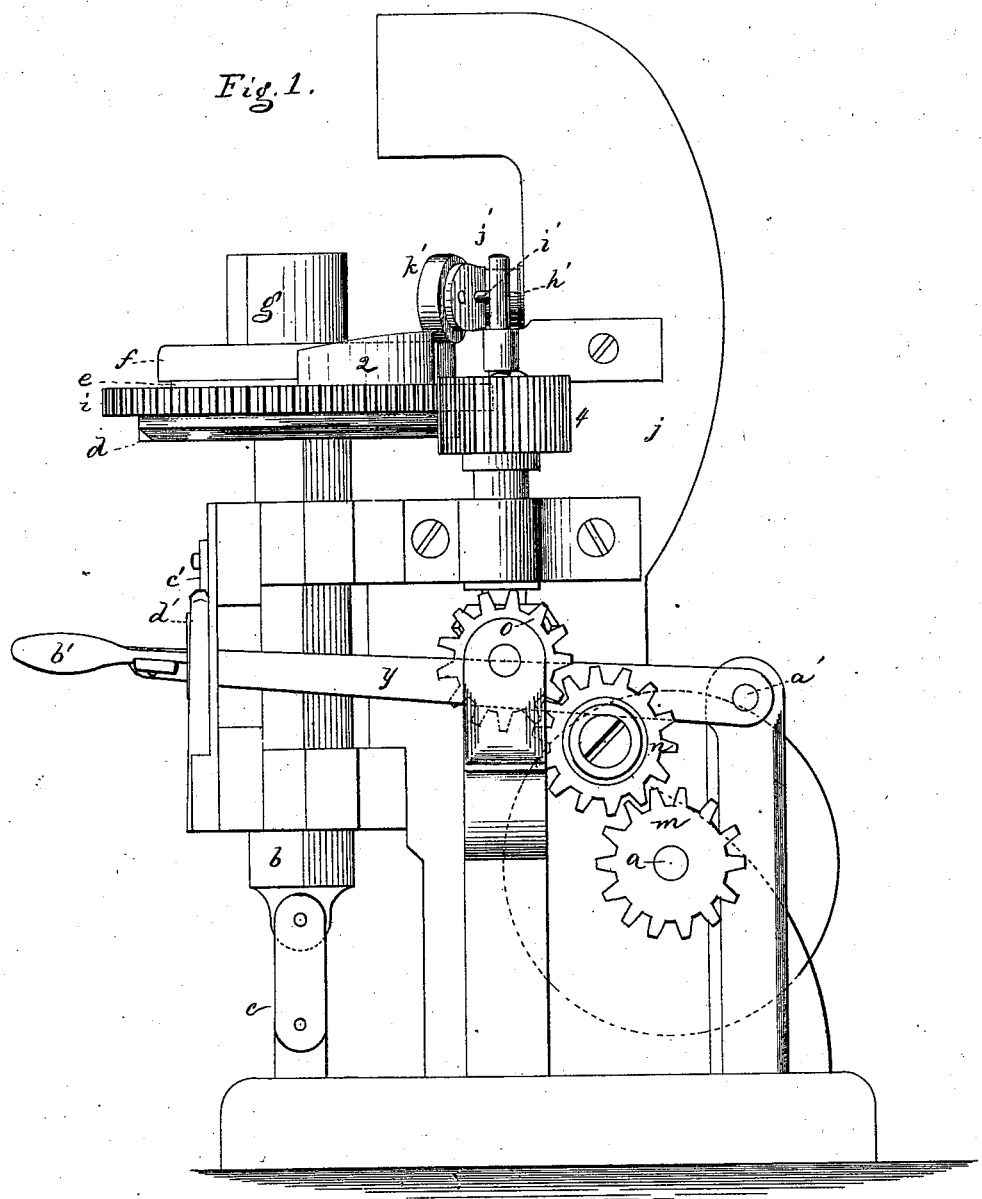

2 Sheets—Sheet 1.

Z. M. LANE.
HEEL MACHINES FOR BOOTS AND SHOES.

No. 183,310. Patented Oct. 17, 1876.

Witnesses.
L. H. Latimer.
W. J. Pratt.

Inventor.
Zenas M. Lane,
per Crosby & Gregory
Att'ys.

2 Sheets—Sheet 2.
Z. M. LANE.
HEEL MACHINES FOR BOOTS AND SHOES.
No. 183,310. Patented Oct. 17, 1876.
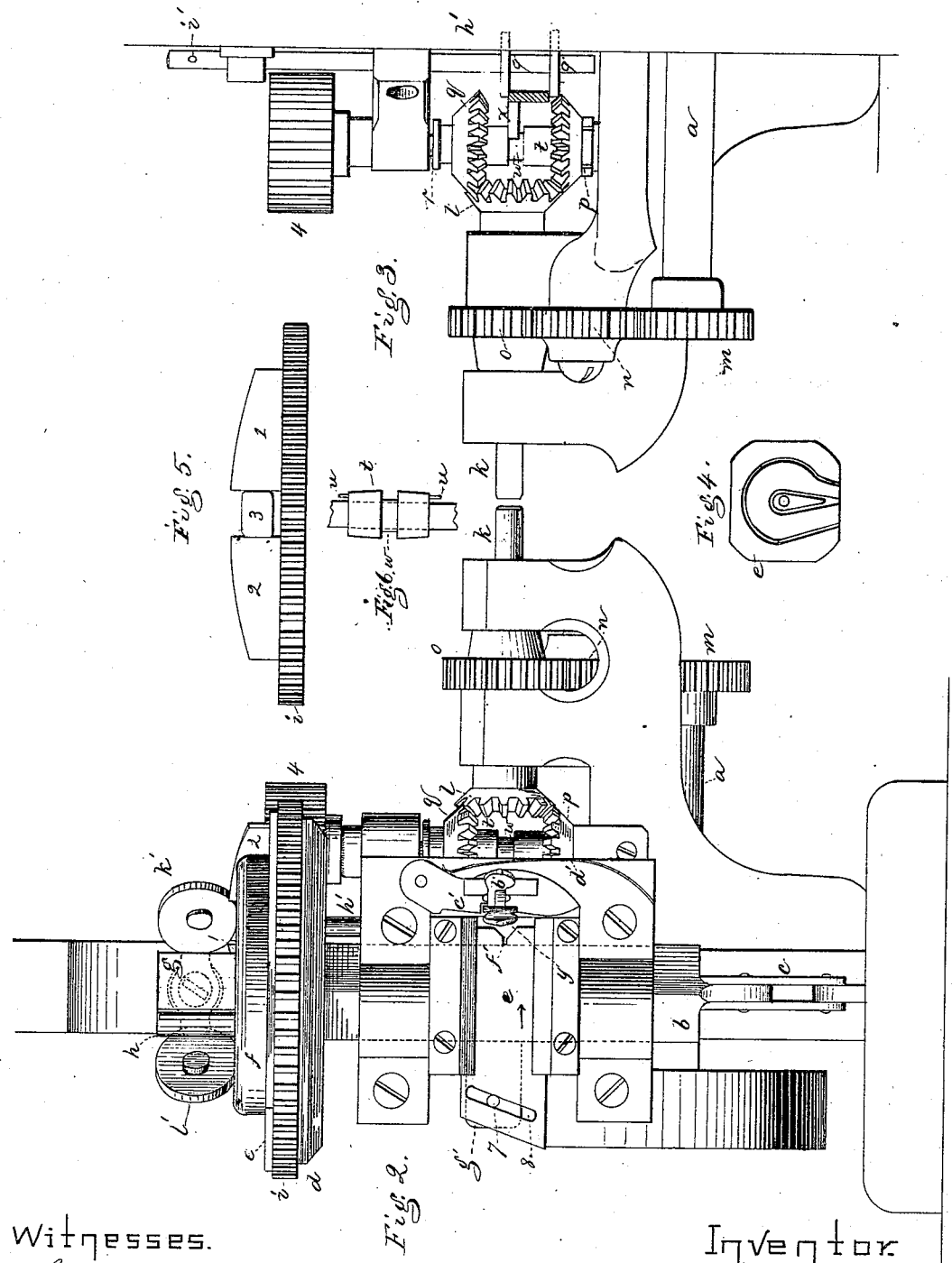
Witnesses.
Inventor.
Jonas M. Lane.
per Crosby & Gregory
Att'ys.

UNITED STATES PATENT OFFICE.

ZENAS M. LANE, OF ROCKLAND, MASSACHUSETTS.

IMPROVEMENT IN HEEL-MACHINES FOR BOOTS AND SHOES.

Specification forming part of Letters Patent No. 183,310, dated October 17, 1876; application filed September 22, 1876.

*To all whom it may concern:*

Be it known that I, ZENAS M. LANE, of Rockland, in the county of Plymouth and State of Massachusetts, have invented an Improvement in Heeling-Machines, of which the following is a specification:

This invention relates to heeling-machines for boots and shoes, and specially to that part of the machine for trimming the heels after they are nailed upon the shoe.

The invention is an improvement upon the well-known McKay heeling-machine, in which the trimming-lever is operated by hand, and its object is to attach to substantially such a machine a reversing-clutch mechanism to move the trimming-lever positively.

In connection with this mechanism, I employ an arm and rod operated through a cam or equivalent, movable with or by the trimming mechanism, as the trimming knife or blade reaches the corners forming the breast of the heel, whereby the clutch is changed to return the trimming mechanism to its initial position, and then to disengage the actuating part of the clutch from the wheels of the clutch. I also provide a lock to hold the clutch-moving hand-lever in central position, and operate the lock through the movement of the working-spindle, whereby the trimming mechanism cannot be operated except after the working-spindle has risen and fastened the heel.

Figure 1 represents, in side elevation, sufficient of a heeling-machine to show my improvements; Fig. 2, a front view; Fig. 3, a detail of the reversing-clutch; Fig. 4, the usual form-plate detached; Figs. 5 and 6, details to be referred to.

In this machine the mechanisms for attaching the heel and for trimming it are the same as in the ordinary McKay machine before referred to, and I have therefore considered it unnecessary to show such mechanisms in detail.

The driving-shaft $a$, working-spindle $b$, toggle-joint $c$, head $d$, form-plate $e$, trimming-lever $f$, nail-box $g$, and cutter or knife stock $h$ are, in practice, as in the McKay machine, and said parts operate as in said machine.

Upon the head $d$, which is a plate attached to the upper end of the working-spindle, I place a circular plate or ring, $i$, shown as a gear, and provided with cams or projections 1 2, between which, as shown in Fig. 5, is placed a projecting portion, 3, of the trimming-lever $f$, the ring or gear and projections therefrom operating the trimming-lever. In suitable bearings at the side of the frame $j$ is mounted a shaft, $k$, provided with a bevel-pinion, $l$, and moved from shaft $a$ through pinions $m$ $n$ $o$. The bevel-pinion $l$ is adapted to engage either of the bevel-pinions $p$ $q$, mounted loosely on shaft $r$, provided at its end with a long pinion, 4, that engages the gear $i$. The actuating part $t$ of the clutch, connected with the shaft $r$ by a spline, so as to rotate with, but yet move thereon, has suitable pins or projections $u$, to enter suitable holes in the bevel-pinions, and engage either of them at will with the pinion $n$, rotating but in one direction. This actuating part $t$ is grooved at $w$, to receive a lug, $x$, projecting from a lever, $y$, pivoted at $a'$. Pivoted to this lever $y$ at its outer end is a short lever, $b'$, the shorter end of which rests against a catch, $c'$, pressed forward to engage the lever $y$ by a spring, $d'$, the hook, when pressed forward, holding the lever, as shown in Figs. 1 and 2, the part $t$ then being free from each of the bevel-pinions $p$ $q$, the shaft $r$ not moving. A lock, $e'$, in this instance composed of a sliding plate notched at $f'$, is employed to lock the lever $y$ in position when the working-spindle is depressed, thereby preventing the possibility of engaging the clutch at that time. The notch $f'$ fits a proper projection on the side of the lever when the lock is moved in the direction of the arrow, the lock being moved in that direction when the working-spindle is depressed through the action of a pin, 7, or equivalent, projecting from a plate, $g'$, attached to the working-spindle $b$, and entering a slot, 8, in the lock.

The drawings show the working-spindle elevated into the position it will occupy after a heel is attached, the knife-carrier and knife then resting in their initial position, as shown, in this instance at the left-hand corner of the heel, looking at it toward the heel-breast. The upward movement of the spindle moved back the lock and released the lever, leaving it to be moved by hand when the operator is ready to trim the heel. The lever $y$, although released from the lock, is yet held by the catch $c'$. The operator now operates the short lever $b'$, to throw back the catch $c'$ and then lift the lever $y$, such movement engaging the part $t$ with the bevel-pinion $q$ of the clutch, and moving the gear $i$ and trimming-lever and cutter about the heel, the knife or cutter being changed in position, in the usual way, by the ordinary grooved form-plate $e$, common to the McKay machine.

A rod, $h'$, supported in suitable bearings, is connected near its upper end by a pin, $i'$, with a pivoted lever, $j'$, provided with rollers $k'$ $l'$. The lower end of this rod $h'$ is provided with projections 9, forming a fork adapted to engage the lever $y$. As the knife reaches the opposite corner of the heel, the cam 2 reaches the roller $l'$, and, striking it, turns the lever $j'$ on its center, which, in turn, depresses the rod $h'$ and lever $y$, thereby disengaging the part $t$ from the bevel-pinion $q$, and engaging it with the bevel-pinion $p$, thereby turning the shaft $r$ and gear $i$ and trimming-lever back to its starting-point, ready to again trim a new heel. The cam 2, on its return movement, strikes the roller $k'$, lifts the rod $h'$ and the lever, and disengages the part $t$ from the pinion $p$; but the lever $y$, so elevated, cannot move far enough upward to engage the part $t$ with the bevel-pinion $q$ because of the catch $c'$. The pinions $p$ $q$ being now both free, the shaft $r$ and the trimming-lever are stopped, leaving the knife in proper initial position to trim a new heel. After the return of the trimming-lever to its starting-point or initial position, the toggle-joint $c$ is operated as usual, the working-spindle is lowered, and the lock, moving forward, engages and holds the lever $y$ until the spindle is again elevated.

I do not intend to limit this invention to the exact clutch or parts $t$ $q$ $p$, as described, as any usual form of, or equivalent, clutch can be employed instead.

The ring $i$ is herein shown as provided with teeth engaged by a pinion, 4; but it is obvious that the ring and the shaft, or an enlarged portion thereon, might be connected in other ways than by teeth, so as to operate in unison. The cams 1 2 might strike the ends of lever $j'$ instead of rollers $k'$ $l'$.

I claim—

1. The working-spindle, head, trimming-lever, and plate or ring, adapted to engage the trimming-lever, in combination with a clutch and shafts $k$ and $r$, adapted to turn the shaft $r$, and plate or ring and trimming-lever, in opposite directions, substantially as described.

2. The plate or ring and cams or projections 1 2, in combination with a lever, $j$, and a connecting-rod to operate the lever, for changing the actuating part of the clutch to reverse the trimming-lever, substantially as described.

3. The working-spindle and lock, in combination with the lever $y$, to hold the actuating part of the clutch out of operative position while the spindle is depressed, substantially as described.

4. The working-spindle and lock, in combination with the lever and catch $c'$ and lever $b'$, substantially as described.

5. The working-spindle, head, and plate or ring, provided with teeth, in combination with the shaft $r$ and long gear 4, adapted to engage the teeth on the plate or ring $i$ in all positions of the working-spindle, substantially as described.

In testimony whereof I have signed my name to this specification in the presence of two subscribing witnesses.

ZENAS M. LANE.

Witnesses:
G. W. GREGORY,
W. J. PRATT.